(12) United States Patent
Byun

(10) Patent No.: US 10,157,007 B2
(45) Date of Patent: Dec. 18, 2018

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 30 days.

(21) Appl. No.: 15/438,855

(22) Filed: Feb. 22, 2017

(65) Prior Publication Data

US 2018/0018111 A1   Jan. 18, 2018

(30) Foreign Application Priority Data

Jul. 14, 2016   (KR) .......................... 10-2016-0089165

(51) Int. Cl.
*G06F 3/06* (2006.01)

(52) U.S. Cl.
CPC .......... *G06F 3/0619* (2013.01); *G06F 3/0604* (2013.01); *G06F 3/064* (2013.01); *G06F 3/0632* (2013.01); *G06F 3/0659* (2013.01); *G06F 3/0679* (2013.01); *G06F 3/0688* (2013.01)

(58) Field of Classification Search
CPC .... G06F 3/0604; G06F 3/0619; G06F 3/0632; G06F 3/064; G06F 3/0659; G06F 3/0679; G06F 3/0688
See application file for complete search history.

(56) References Cited

U.S. PATENT DOCUMENTS

| | | |
|---|---|---|
| 8,397,018 B2 | 3/2013 | Dhakshinamurthy et al. |
| 9,378,137 B2 | 6/2016 | Kim et al. |
| 2012/0221767 A1* | 8/2012 | Post .................... G06F 13/1673 711/103 |
| 2015/0113237 A1 | 4/2015 | Kim |
| 2015/0127887 A1 | 5/2015 | Kim et al. |

FOREIGN PATENT DOCUMENTS

| | | |
|---|---|---|
| KR | 1020100128120 | 12/2010 |
| KR | 1020150130638 | 11/2015 |

* cited by examiner

*Primary Examiner* — Yong J Choe
(74) *Attorney, Agent, or Firm* — IP & T Group LLP

(57) ABSTRACT

A memory system may include: a memory device including a plurality of memory dies, each die including a plurality of memory blocks, each block including a plurality of pages; and a controller suitable for performing a command operation for the memory device and storing segments of user data and metadata for the command operation in a super memory block including memory blocks of memory dies included in a first memory die group and a second memory die group among the plurality of memory dies.

8 Claims, 11 Drawing Sheets

MEMORY SYSTEM AND OPERATING METHOD THEREOF

CROSS-REFERENCE TO RELATED APPLICATION

This U.S. non-provisional patent application claims priority under 35 U.S.C. § 119(a) to Korean Patent Application No. 10-2016-0089165 filed on Jul. 14, 2016 in the Korean Intellectual Property Office (KIPO), the disclosure of which is incorporated herein by reference in its entirety.

TECHNICAL FIELD

Exemplary embodiments of the present inventive concept relate to a memory system which processes data with respect to a memory device, and an operating method thereof.

DISCUSSION OF THE RELATED ART

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. The memory system may be used as a main memory device or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory system may include: a memory device including a plurality of memory dies, each die including a plurality of memory blocks, each block including a plurality of pages; and a controller suitable for performing a command operation for the memory device and storing segments of user data and metadata for the command operation in a super memory block including memory blocks of memory dies included in a first memory die group and a second memory die group among the plurality of memory dies.

The controller may sequentially store the segments in pages included in the super memory block, through at least one scheme of a channel interleaving scheme and a memory die interleaving scheme.

The super memory block may include a first memory block included in a first memory die in the first memory die group and a second memory block included in a second memory die in the second memory die group, and the pages of the super memory block may alternately correspond to pages of the first memory block and pages of the second memory block.

In a power-on state of the memory system, the controller may store a first segment in a first page of the first memory block corresponding to a first page of the super memory block, and then, may store a second segment in a first page of the second memory block corresponding to a second page of the super memory block.

If a power-off occurs in the memory system while storing the first segment and the second segment and then the memory system is changed again to the power-on state, the controller may perform a booting operation for the super memory block.

The controller may sense simultaneously the first page in the first memory block and the first page in the second memory block, in correspondence to the at least one scheme, during the booting operation.

Memory dies included in the first memory die group may be coupled to a first channel, and memory dies included in the second memory die group may be coupled to a second channel.

The super memory block may include a first memory block included in a first memory die and a second memory block included in a second die in the first memory die group, and a third memory block included in a third memory die and a fourth memory block included in a fourth memory die in the second memory die group, and the pages of the super memory block may alternately correspond to pages of the first memory block, pages of the second memory block, pages of the third memory block and pages of the fourth memory block.

A first page of the super memory block may correspond to a first page of the first memory block, a second page of the super memory block may correspond to a first page of the third memory block, a third page of the super memory block may correspond to a first page of the second memory block, and a fourth page of the super memory block may correspond to a first page of the fourth memory block.

In a power-on state of the memory system, the controller may store the segments sequentially in the first page, the second page, the third page and the fourth page of the super memory block, in correspondence to the at least one scheme, and if a power-off occurs in the memory system and then the memory system is changed again to the power-on state, the controller may simultaneously sense the first page, the second page, the third page and the fourth page of the super memory block, in correspondence to the at least one scheme.

In an embodiment, a method for operating a memory system may include: receiving a command from a host, for a plurality of pages which are included in each of a plurality of memory blocks of a memory device; performing a command operation corresponding to the command, for the plurality of memory blocks included in a plurality of memory dies included in the memory device; and storing segments of user data and metadata for the command operation, in a super memory block including memory blocks of memory dies included in a first memory die group and a second memory die group among the plurality of memory dies.

The storing may sequentially store the segments in pages included in the super memory block, through at least one scheme of a channel interleaving scheme and a memory die interleaving scheme.

The super memory block may include a first memory block included in a first memory die in the first memory die group and a second memory block included in a second memory die in the second memory die group, and the pages of the super memory block may alternately correspond to pages of the first memory block and pages of the second memory block.

The storing may include, in a power-on state of the memory system: storing a first segment in a first page of the first memory block corresponding to a first page of the super memory block; and storing a second segment in a first page of the second memory block corresponding to a second page of the super memory block.

The method may further include: performing a booting operation for the super memory block, if a power-off occurs in the memory system while storing the first segment and the second segment and then the memory system is changed again to the power-on state.

The performing of the booting operation may include: sensing simultaneously the first page in the first memory block and the first page in the second memory block, in correspondence to the at least one scheme.

The memory dies included in the first memory die group may be coupled to a first channel, and the memory dies included in the second memory die group may be coupled to a second channel.

The super memory block may include a first memory block included in a first memory die and a second memory block included in a second die in the first memory die group, and a third memory block included in a third memory die and a fourth memory block included in a fourth memory die in the second memory die group, and the pages of the super memory block may alternately correspond to pages of the first memory block, pages of the second memory block, pages of the third memory block and pages of the fourth memory block.

A first page of the super memory block may correspond to a first page of the first memory block, a second page of the super memory block may correspond to a first page of the third memory block, a third page of the super memory block may correspond to a first page of the second memory block, and a fourth page of the super memory block may correspond to a first page of the fourth memory block.

The method may further include: storing, in a power-on state of the memory system, the segments sequentially in the first page, the second page, the third page and the fourth page of the super memory block, in correspondence to the at least one scheme; and simultaneously sensing, if a power-off occurs in the memory system and then the memory system is changed again to the power-on state, the first page, the second page, the third page and the fourth page of the super memory block, in correspondence to the at least one scheme.

In an exemplary embodiment of the present inventive concept, a method for operating a memory system may include: providing a super memory block and a controller coupled to the super memory block, the super memory block includes a first memory block in a first die and a second memory block in a second die; performing a booting operation for the super memory block, if a power-off occurs in the super memory block while storing segments of user data and metadata for a command operation through at least one of a channel interleaving scheme and a memory die interleaving scheme and then the super memory block and the controller are changed again to a power-on state; and performing a recovery operation for pages which are not normally program-completed in the super memory block, wherein the booting operation includes sensing simultaneously the pages which are not normally program-completed in the first and second memory blocks, in correspondence to the at least one of the channel interleaving scheme and the memory die interleaving scheme.

BRIEF DESCRIPTION OF THE DRAWINGS

These and other features and advantages of the present invention will become apparent to persons skilled in the art to which this invention pertains from the following detailed description of various embodiments of the present invention in reference to the accompanying drawings, wherein.

DETAILED DESCRIPTION

Figure 1:
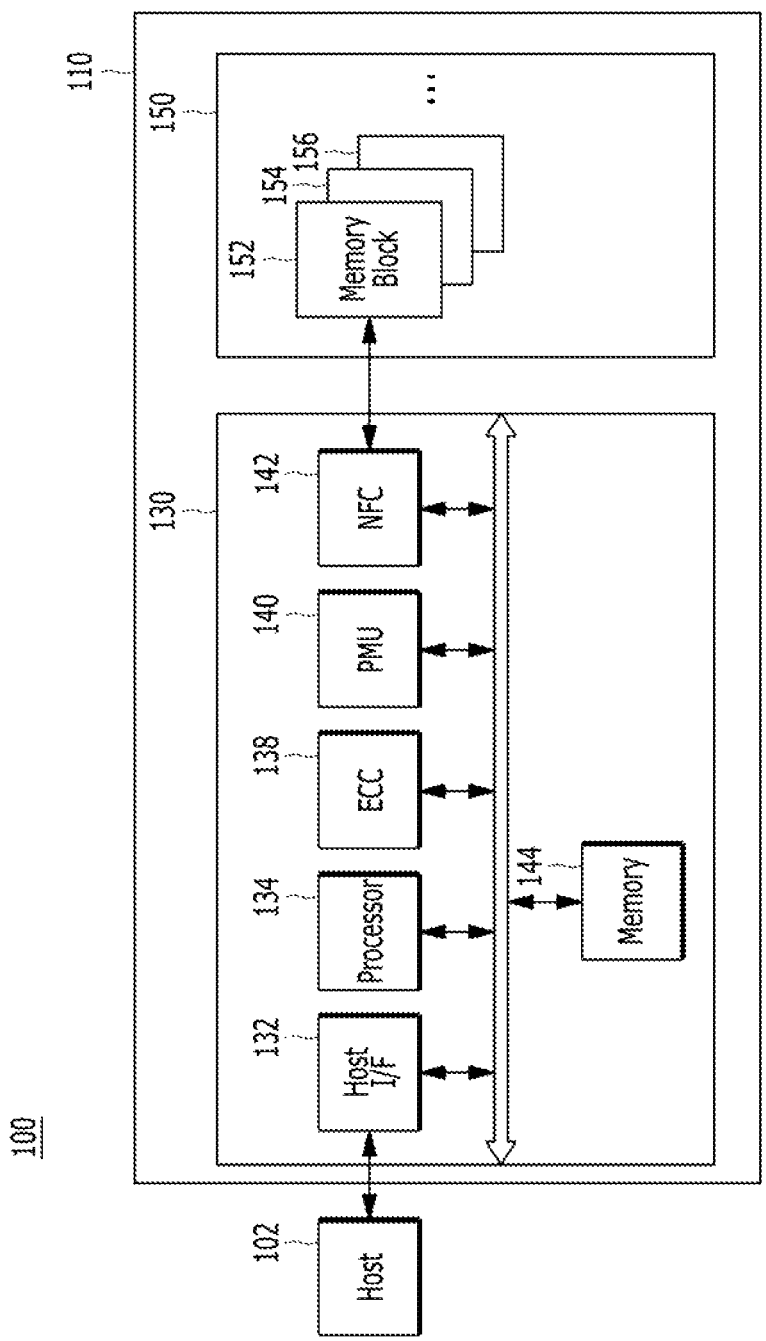
FIG. 1 is a diagram illustrating a data processing system including a memory system coupled to a host, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art to which this invention pertains, a feature or element described in connection with one embodiment may be used singly or in combination with other features or elements of another embodiment, unless otherwise specifically indicated.

Hereinafter, the various embodiments of the present inventive concept will be described in detail with reference to the attached drawings.

Referring now to FIG. 1 a data processing system 100 is provided, according to an embodiment of the present invention.

The data processing system 100 may include a memory system 110 operatively coupled to a host 102.

The host 102 may be or include, for example, a portable electronic device such as a mobile phone, an MP3 player and a laptop computer or a non-portable electronic device such as a desktop computer, a game player, a TV and a projector.

The memory system 110 may operate in response to a request received from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device configured as a solid state drive (SSD). When the memory system 110 is used as an SSD, the operation speed of the host 102 that is electrically coupled with the memory system 110 may be significantly increased.

The controller 130 and the memory device 150 may be integrated into one semiconductor device configured as a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply to the device is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells which are electrically coupled to a word line (WL). The memory device 150 may be a nonvolatile memory device, for example, a flash memory. The flash memory may have a three-dimensional (3D) stack structure. A structure of the memory device 150 will be described later in detail with reference to FIGS. 2 to 4.

The controller 130 of the memory system 110 may control the memory device 150 in response to a request received from the host 102. The controller 130 may provide data read from the memory device 150 to the host 102, and store data provided from the host 102 into the memory device 150. To this end, the controller 130 may control overall operations of the memory device 150, such as read, write, program and erase operations.

For example, the controller 130 may include a host interface unit 132, a processor 134, an error correction code (ECC) unit 138, a power management unit (PMU) 140, a NAND flash controller (NFC) 142, and a memory 144 operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all suitable circuits, systems or devices for the error correction operation.

The PMU 140 may provide and manage power for the controller 130, that is, power for the component elements included in the controller 130. Any suitable PMU may be employed.

The NFC 142 may be an example of a memory interface between the controller 130 and the memory device 150 allowing the controller 130 to control the memory device 150 in response to a request received from the host 102. For example, the NFC 142 may generate control signals for the memory device 150 and process data under the control of the processor 134 when the memory device 150 is a flash memory and, in particular, when the memory device 150 is a NAND flash memory. When the memory device 150 is not a NAND flash memory, other well-known memory interfaces may be employed that are suitable for serving as a memory interface between the controller 130 and the memory device 150 for allowing the controller 130 to control the memory device 150 in response to a request received from the host 102.

The memory 144 may serve as a working memory of the memory system 110 and the controller 130, and store data for driving the memory system 110 and the controller 130. The controller 130 may control the memory device 150 in response to a request received from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control the operations of the memory system 110 including a write operation or a read operation for the memory device 150, in response to a write request or a read request received from the host 102. The processor 134 may drive firmware such as a flash translation layer (FTL), for controlling the operations of the memory system 110. For example, the processor 134 may be implemented with a microprocessor. Also, as an example, the processor 134 may be implemented with a central processing unit (CPU).

Other units may also be employed. For example, a bad block management unit (not shown) may be included in the processor 134 for performing bad block management of the memory device 150. The bad block management unit may find bad memory blocks included in the memory device 150, which are in an unsatisfactory condition for further use, and perform bad block management on the bad memory blocks. For example, when the memory device 150 is a flash memory, (for example, a NAND flash memory), a program failure may occur during a write operation, (also referred to as a program operation), due to a characteristic of a NAND logic function. During a bad block management operation, the data of the program-failed memory block or the bad memory block may be programmed into a new memory block. The bad memory block may then be disabled. Hence, to reduce deterioration of the utilization efficiency of the memory device 150 having a 3D stack structure and to protect the reliability of the memory system 100 bad block management may be employed. Any suitable bad block management unit and method may be employed.

Figure 2:
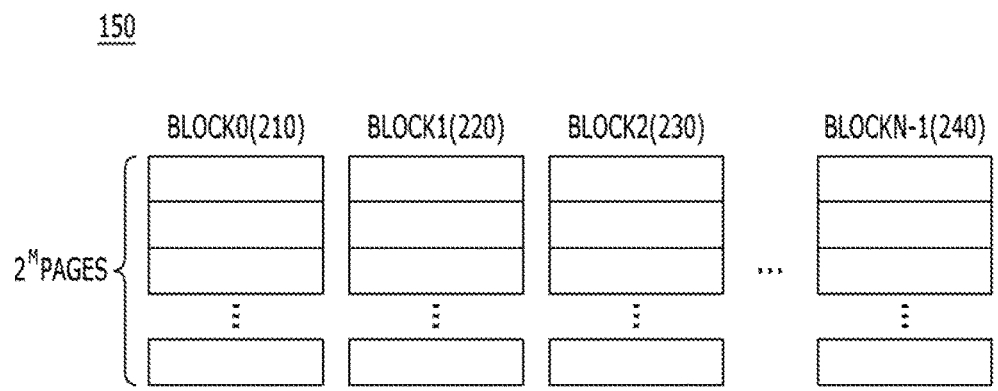
FIG. 2 is a diagram illustrating a memory device employed in the memory system of FIG. 1, according to an embodiment of the present invention.

FIG. 2 is a diagram illustrating a configuration example of the memory device 150 of FIG. 1, according to an embodiment of the present invention.

Referring to FIG. 2, the memory device 150 may include a plurality of memory blocks 210 to 240. For example, the memory device 150 may include zeroth to $(N-1)^{th}$ memory blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present inventive concept will not be limited. Each of the plurality of pages may include a plurality of memory cells electrically coupled to a word line.

The memory device 150 may include a plurality of memory blocks, as single level cell (SLC) memory blocks and multi-level cell (MLC) memory blocks, according to the number of bits which may be stored or expressed in each memory cell. An SLC memory block may include a plurality of pages which are implemented with memory cells each capable of storing 1-bit data. An MLC memory block may include a plurality of pages which are implemented with memory cells each capable of storing multi-bit data (e.g., two or more-bit data). The MLC memory block including a plurality of pages which are implemented with memory cells that are each capable of storing 3-bit data may be also referred to as a triple level cell (TLC) memory block.

Each of the plurality of memory blocks 210 to 240 may store data provided from the host 102 during a write operation, and may provide stored data to the host 102 during a read operation.

Figure 3:
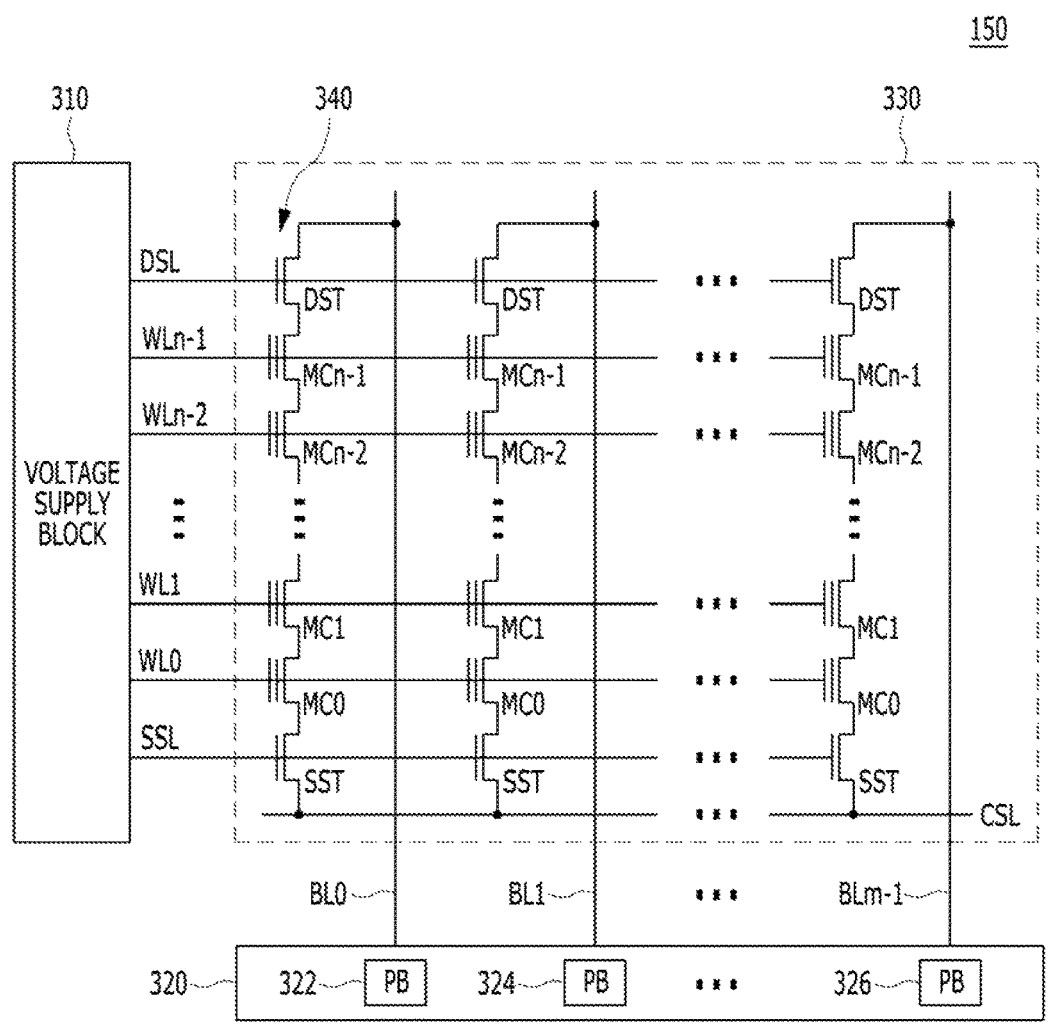
FIG. 3 is a diagram illustrating a memory cell array circuit of a memory block in a memory device, according to an embodiment of the present invention.

FIG. 3 is a circuit diagram illustrating a memory block 152 of the memory device 150 in FIG. 1.

Referring to FIG. 3, the memory block 152 of the memory device 150 may include a plurality of cell strings 340 which are electrically coupled to a plurality of bit lines BL0 to BLm−1, respectively. Each cell string 340 may include at least one drain select transistor DST and at least one source select transistor SST. Each cell string 340 may also include a plurality of memory cells (or a plurality of memory cell transistors) MC0 to MCn−1 electrically coupled in series between the at least one drain select transistor DST and the at least one source select transistor SST. Each of the memory cells MC0 to MCn−1 may be configured by a multi-level cell (MLC) which stores data information of a plurality of bits. Each of the strings 340 may be electrically coupled to a corresponding bit line among the plurality of bit lines BL0 to BLm−1. For reference, in FIG. 3, 'DSL' denotes a drain select line, 'SSL' denotes a source select line, and 'CSL' denotes a common source line.

While FIG. 3 shows, as an example, the memory block 152 of the memory device 150 which is configured by NAND flash memory cells, it is noted that the memory block 152 is not limited to NAND flash memory cells. For example, according to other embodiments, the memory block 152 may be implemented with NOR flash memory cells, or hybrid flash memory cells in which at least two kinds of memory cells are combined. In an exemplary embodiment, the memory block 152 may be implemented as a one-NAND flash memory in which a controller is built in a memory chip. In an embodiment, the memory device 152 may be a flash memory device in which a charge storing layer is configured by conductive floating gates. In another embodiment, the memory device 152 may be a charge trap flash (CTF) in which a charge storing layer is configured by a dielectric layer.

A voltage supply block 310 of the memory device 150 may provide word line voltages such as a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the received data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Figure 4:
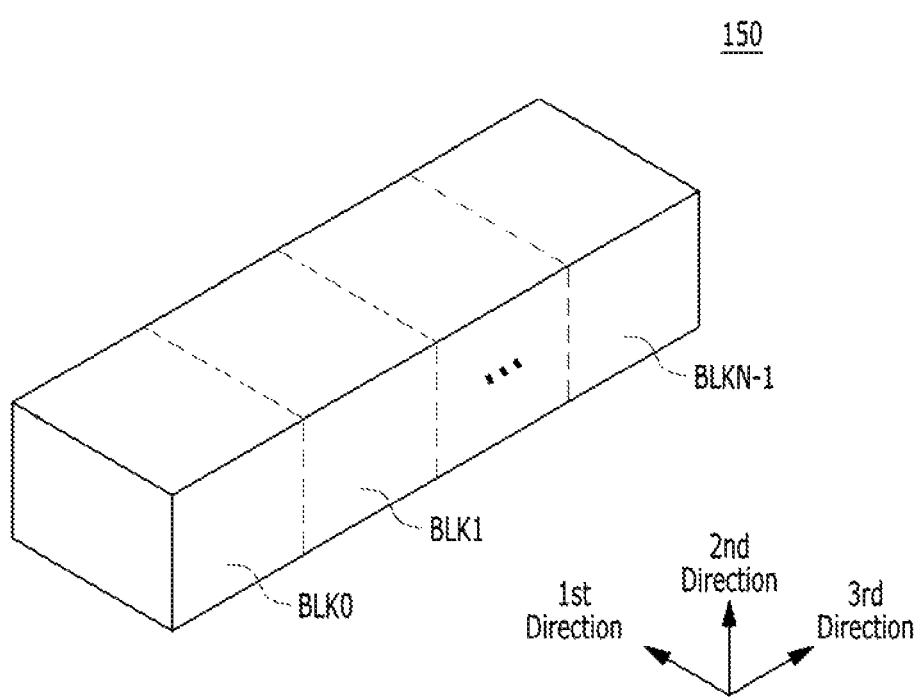
FIG. 4 is a diagram illustrating a structure of a memory device in a memory system, according to an embodiment of the present invention.

FIG. 4 is a block diagram illustrating an example of a memory device 150.

Referring to FIG. 4, the memory device 150 may include a plurality of memory blocks BLK0 to BLKN−1, each of the memory blocks BLK0 to BLKN−1 being implemented in a three-dimensional (3D) structure (also referred to as a vertical structure). Each of the memory blocks BLK0 to BLKN−1 may include structures which extend in first to third directions. The respective memory blocks BLK0 to BLKN−1 may include a plurality of cell strings, for example, a plurality of NAND strings, each cell string extending in the second direction, e.g., in the vertical direction. The plurality of NAND strings may be spaced apart at regular intervals in the first and second directions. Each NAND string may be electrically coupled to a bit line, at least one source select line, at least one drain select line, a plurality of word lines, at least one dummy word line, and a common source line. Namely, the respective memory blocks BLK0 to BLKN−1 may be electrically coupled to a plurality of bit lines, a plurality of source select lines, a plurality of drain select lines, a plurality of word lines, a plurality of dummy word lines, and a plurality of common source lines. Hereinbelow, detailed descriptions will be made with reference to FIGS. 5 to 8, for data processing with respect to a memory device 150 in a memory system according to an embodiment of the present invention. Particularly, a command data processing operation corresponding to a command received from the host 102 with respect to the memory device 150 will be described.

FIGS. 5 to 8 are diagrams to assist in the explanation of a data processing operation with respect to a memory device in a memory system according to an embodiment. Hereinbelow, for the sake of convenience in explanation, descriptions will be made, as an example, for data processing in the case where, in the memory system 110 shown in FIG. 1, after storing command data corresponding to a command received from the host 102, for example, write data corresponding to a write command, in the buffer/cache included in the memory 144 of the controller 130, a command operation corresponding to the command received from the host 102 is performed. For example, the data stored in the buffer/cache are written, that is, programmed, in the plurality of memory blocks included in the memory device 150. Stored data, i.e., data programmed in the memory device 150, may be updated and reprogrammed in the memory device 150.

According to an embodiment the controller 130 may perform a data processing operation in the memory system 110. More specifically, the processor 134 included in the controller 130 may perform data processing through, for example, an FTL (flash translation layer). The data processing operation may include first storing user data and metadata corresponding to a write command received from the host 102 in a buffer included in the memory 144 of the controller 130, and then writing and storing the data stored in the buffer in one or more memory blocks among the plurality of memory blocks included in the memory device 150.

The metadata may include first map data including logical/physical (logical to physical; L2P) Information (hereinafter, referred to as a 'logical information') and second map data including physical/logical (physical to logical; P2L) information (hereinafter, referred to as a 'physical information'), for the data stored in the memory blocks in correspondence to the program operation. The metadata may also include an Information on the command data corresponding to the command received from the host 102, an information on the command operation corresponding to the command, an information on the memory blocks of the memory device 150 for which the command operation is to be performed, and an information on map data corresponding to the command operation. In other words, the metadata may include all remaining informations (data) excluding the user data corresponding to the command received from the host 102.

In an embodiment of the present disclosure, the controller 130 may perform a write operation pursuant to a write request received from the host 102. More specifically, the user data corresponding to the write command may be written and stored in at least one first memory block of the memory device 150. Also, metadata corresponding to the write command are being written and stored in at least one second memory block among the memory blocks of the memory device 150. The at least one first and second memory blocks may be same or may be different. Preferably, the at least one first and second memory blocks may be same. The at least one first and second memory block or blocks may be open memory blocks for which an erase operation is performed or free memory blocks among the memory blocks of the memory device 150.

The metadata may including a mapping information between logical addresses and physical addresses for the user data stored in the memory blocks, that is, first map data including an L2P map table or an L2P map list in which logical informations are recorded, and a mapping information between physical addresses and logical addresses for the memory blocks in which the user data are stored, that is, second map data including a P2L map table or a P2L map list in which physical informations are recorded. In particular embodiment of the present disclosure, when the write command is received from the host 102, the user data corresponding to the write command are written and stored in at least one first memory block, and metadata including the first map data and the second map data for the user data stored in the at least one first memory block are stored in at least one second memory block. For example, data segments of the user data and meta segments of the metadata, that is, L2P segments of the first map data and P2L segments of the second map data as map segments of map data, may be stored in the at least one first and second memory blocks of the memory blocks of the memory device 150, respectively. More specifically, after the controller 130 stores the data segments of the user data and the meta segments of the metadata in the memory 144 included in the controller 130, the controller 130 stores the data segments of the user data and the meta segments of the metadata in the at least one first and second memory blocks of the memory device 150, respectively. In particular, as the data segments of the user data are stored in the at least one first memory block of the memory device 150, the controller 130 generates, updates and stores meta segments, for example, performs a map flush operation. The at least one first memory block and the at least one second memory block may be different or the same. The at least one first memory block and the at least one second memory block may each be a superblock.

In an embodiment of the present disclosure, a read operation corresponding to a read command received from the host 102 is performed by reading read data corresponding to the read command from the memory device 150, storing the read data in the buffer/cache included in the memory 144 of the controller 130, and providing the data stored in the buffer/cache to the host 102.

In the embodiment of the present disclosure, descriptions will be made by exemplifying data processing in the case where a power state is changed while the memory system 110 performs a command operation corresponding to a command received from the host 102 in a power-on state, in particular, in the case where a power state is changed from a power-on state to a power-off state while the memory system 110 performs, in the power-on state, a program operation corresponding to a write command received from the host 102, with respect to a plurality of memory blocks included in the memory device 150. That is to say, in the embodiment of the present disclosure, descriptions will be made by exemplifying data processing in the memory system 110 in the case where, after the memory system 110 is changed to a power-off state as a sudden power-off occurs while performing a program operation in a power-on state, the memory system 110 is changed again from the power-off state to a power-on state.

In an embodiment of the present disclosure, a booting operation and a recovery operation are performed in the memory system 110, in the case where the memory system 110 is changed from a power-off state to a power-on state, after the memory system 110 is changed to the power-off state as a sudden power-off occurs in the memory system 110 while the memory system 110 performs, in a power-on state, a program operation corresponding to a write command received from the host 102, in particular, while the memory system 110 programs, in a power-on state, write data corresponding to a write command, in an optional page of an optional memory block among the plurality of memory blocks included in the memory device 150.

Figure 5:
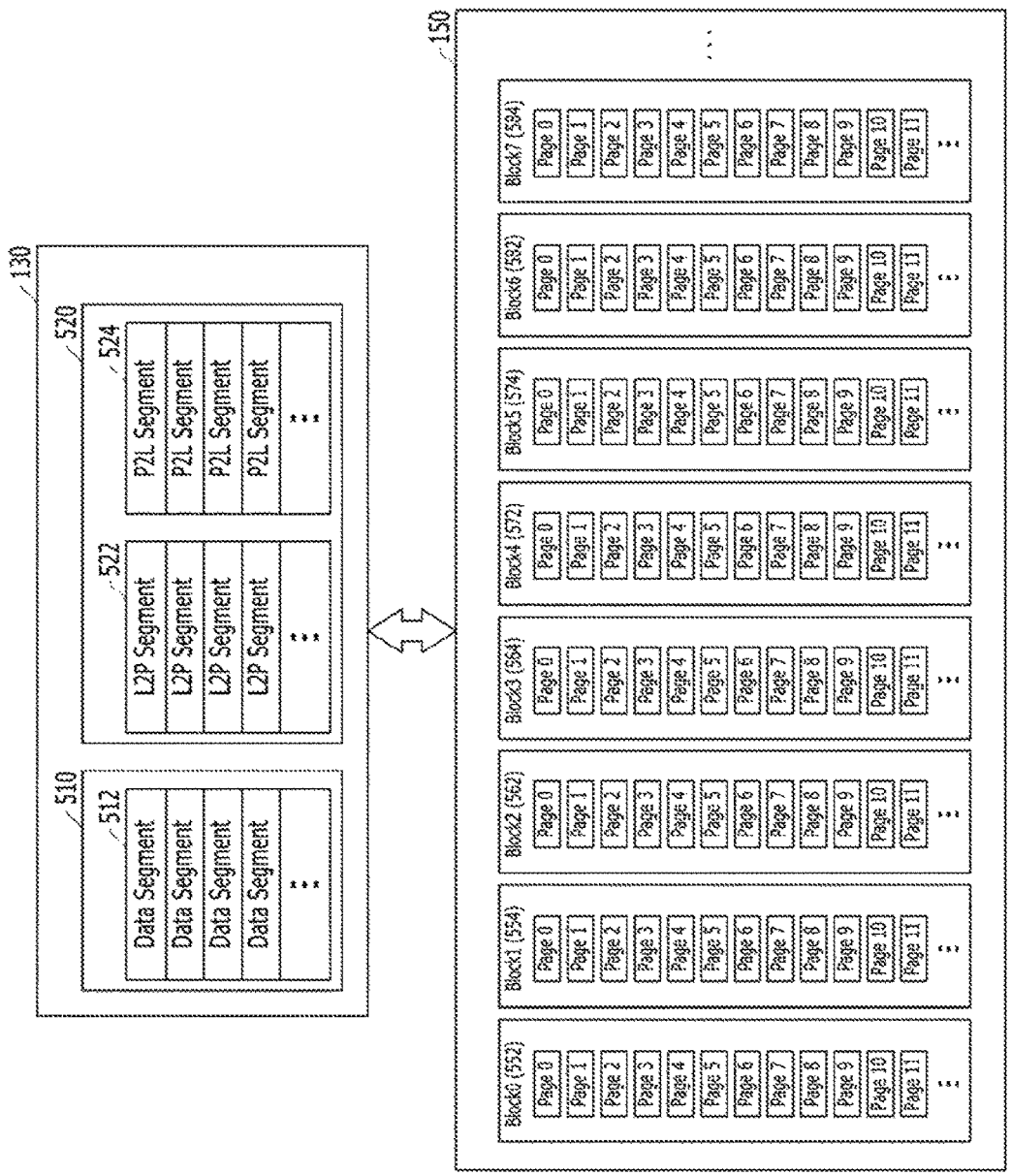
FIGS. 5 to 8 are diagrams to assist in the explanation of a data processing operation with respect to a memory device in a memory system according to an embodiment of the present invention.

Referring to FIG. 5, the controller 130 may perform a command operation corresponding to a command received from the host 102, for example, a program operation corresponding to a write command. At this time, the controller 130 may write and store user data corresponding to the write command, in memory blocks 552, 554, 562, 564, 572, 574, 582 and 584 of the memory device 150. Also, in correspondence to the write operation to the memory blocks 552, 554, 562, 564, 572, 574, 582 and 584, the controller 130 may generate and update metadata for the user data and write and store the metadata in the memory blocks 552, 554, 562, 564, 572, 574, 582 and 584 of the memory device 150.

The controller 130 may generate and update informations indicating that the user data are stored in the pages included in the memory blocks 552, 554, 562, 564, 572, 574, 582 and 584 of the memory device 150, for example, first map data and second map data, that is, generate and update the logical segments, that is, L2P segments, of the first map data and the physical segments, that is, P2L segments, of the second map data, and then, stores the L2P segments and the P2L segments in the pages included the memory blocks 552, 554, 562, 564, 572, 574, 582 and 584 of the memory device 150, by performing a map flush operation.

For example, the controller 130 may cache and buffer the user data corresponding to the write command received from the host 102, in a first buffer 510 included in the memory 144 of the controller 130, that is, store data segments 512 of the user data in the first buffer 510 as a data buffer/cache. Then, the controller 130 may write and store the data segments 512 stored in the first buffer 510, in the pages included in the memory blocks 552, 554, 562, 564, 572, 574, 582 and 584 of the memory device 150.

As the data segments 512 of the user data corresponding to the write command received from the host 102 are written and stored in the pages included in the memory blocks 552, 554, 562, 564, 572, 574, 582 and 584 of the memory device 150, the controller 130 may generate the first map data and the second map data, and store the first map data and the second map data in a second buffer 520 included in the memory 144 of the controller 130. More specifically, the controller 130 may store L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 may write and store the L2P segments 522 of the first map data and the P2L segments 524 of the second map data which are stored in the second buffer 520, in the pages included in the memory blocks 552, 554, 562, 564, 572, 574, 582 and 584 of the memory device 150.

Also, the controller 130 may perform a command operation corresponding to a command received from the host 102, for example, a read operation corresponding to a read command. At this time, the controller 130 may load user data corresponding to the read command, for example, L2P segments 522 of first map data and P2L segments 524 of second map data, in the second buffer 520, and check the L2P segments 522 and the P2L segments 524. After that, the controller 130 may read the user data stored in the pages included in corresponding memory blocks among the memory blocks 552, 554, 562, 564, 572, 574, 582 and 584 of the memory device 150, store data segments 512 of the read user data in the first buffer 510, and provide the data segments 512 to the host 102.

Figure 6:
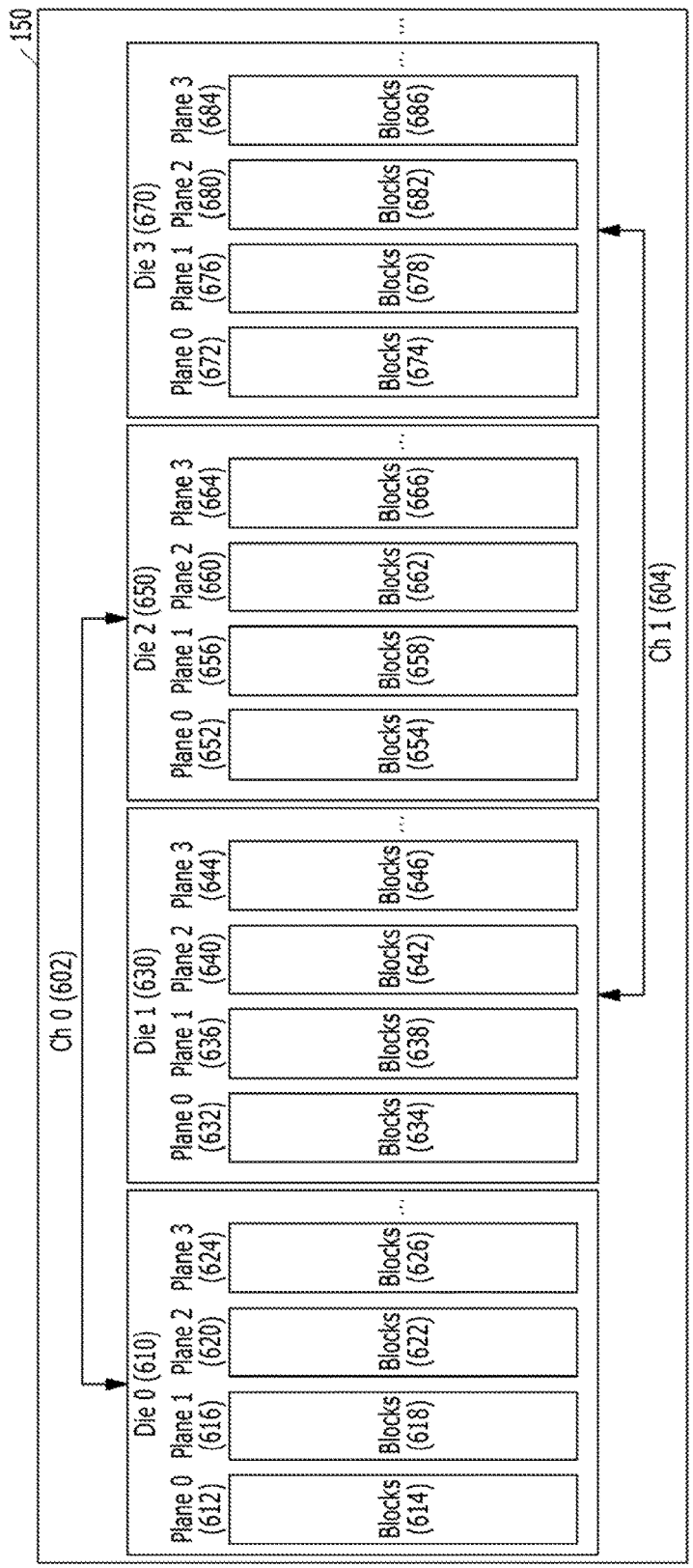

Referring to FIG. 6, the memory device 150 may include a plurality of memory dies, for example, a memory die 0 610, a memory die 1 630, a memory die 2 650 and a memory die 3 670. Each of the memory dies 610, 630, 650 and 670 may include a plurality of planes. For example, the memory die 0 610 may include a plane 0 612, a plane 1 616, a plane 2 620 and a plane 3 624. The memory die 1 630 may include a plane 0 632, a plane 1 636, a plane 2 640 and a plane 3 644. The memory die 2 650 may include a plane 0 652, a plane 1 656, a plane 2 660 and a plane 3 664, and the memory die 3 670 may include a plane 0 672, a plane 1 676, a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 may include a plurality of memory blocks 614, 618, 622, 626, 634, 638, 642, 646, 654, 658, 662, 666, 674, 678, 682 and 686, for example, N number of blocks Block0, Block1, . . . and BlockN–1. Each block may include a plurality of pages, for example, $2^M$ number of pages, as described above with reference to FIG. 2. The plurality of memory dies of the memory device 150 may be coupled to the same channels. For example, the memory die 0 610 and the memory die 2 650 may be coupled to a channel 0 602, and the memory die 1 630 and the memory die 3 670 may be coupled to a channel 1 604.

In the embodiment of the present disclosure, in consideration of program sizes in the memory blocks 614, 618, 622, 626, 634, 638, 642, 646, 654, 658, 662, 666, 674, 678, 682 and 686 of the respective planes 612, 616, 620, 624, 632, 636, 640, 644, 652, 656, 660, 664, 672, 676, 680 and 684 included in the respective memory dies 610, 630, 650 and 670 of the memory device 150 as described above with reference to FIG. 6, user data and metadata of a command operation corresponding to a command received from the host 102 may be written and stored in the pages included in the respective memory blocks 614, 618, 622, 626, 634, 638, 642, 646, 654, 658, 662, 666, 674, 678, 682 and 686. In particular, after grouping the memory blocks 614, 618, 622, 626, 634, 638, 642, 646, 654, 658, 662, 666, 674, 678, 682 and 686 into a plurality of super memory blocks, user data and metadata of a command operation corresponding to a command received from the host 102 may be written and stored in the super memory blocks, for example, through a one shot program.

Each of the super memory blocks may include a plurality of memory blocks, for example, at least one memory block included in a first memory block group and at least one memory block included in a second memory block group. The first memory block group and the second memory block group may be different memory dies coupled to different channels. Further, a plurality of memory blocks, for example, a first memory block and a second memory block, in a first memory block group coupled to a first channel may be memory blocks in memory dies coupled to different ways of a channel, and a plurality of memory blocks, for example, a third memory block and a fourth memory block, in a second memory block group coupled to a second channel may be memory blocks in memory dies coupled to different ways of a channel.

For example, a random first super memory block may include a first memory block included in a first memory die coupled to a first channel, a second memory block included in a second memory die coupled to a second channel, a third memory block included in a third memory die coupled to the first channel, and a fourth memory block included in a fourth memory die coupled to the second channel. While it is described in the embodiment of the present disclosure, for the sake of convenience in explanation, that, as described above, one super memory block includes 4 memory blocks, it is to be noted that one super memory block may include only a first memory block included in a first memory die coupled to a first channel and a second memory block included in a second memory die coupled to a second channel, that is, only 2 memory blocks.

In the embodiment of the present disclosure, in the case of performing a program operation in the super memory blocks included in the memory device 150, data segments of user data and meta segments of metadata for the user data may be stored in the plurality of memory blocks included in the respective super memory blocks, through an interleaving scheme, in particular, a channel interleaving scheme and a memory die interleaving scheme or a memory chip interleaving scheme. To this end, the memory blocks included in the respective super memory blocks may be memory blocks included in different memory dies, in particular, memory blocks of different memory dies coupled to different channels.

Moreover, in the embodiment of the present disclosure, in the case where, as described above, a random first super memory block may include 4 memory blocks included in 4 memory dies coupled to 2 channels, in order to ensure that a program operation is performed through a channel interleaving scheme and a memory die interleaving scheme, the first page of the first super memory block corresponds to the first page of a first memory block, the second page next to the first page of the first super memory block corresponds to the first page of a second memory block, the third page next to the second page of the first super memory block corresponds to the first page of a third memory block, and the fourth page next to the third page of the first super memory block corresponds to the first page of a fourth memory block. In the embodiment of the present disclosure, the program operation may be performed sequentially from the first page of the first super memory block. Hereinbelow, detailed descriptions will be made by taking an example with reference to FIG. 7, for an operation of performing a program operation for a super memory block included in the memory device 150 in a memory system according to an embodiment, for example, an operation of storing segments of user data and metadata corresponding to a write command received from the host 102.

Figure 7:
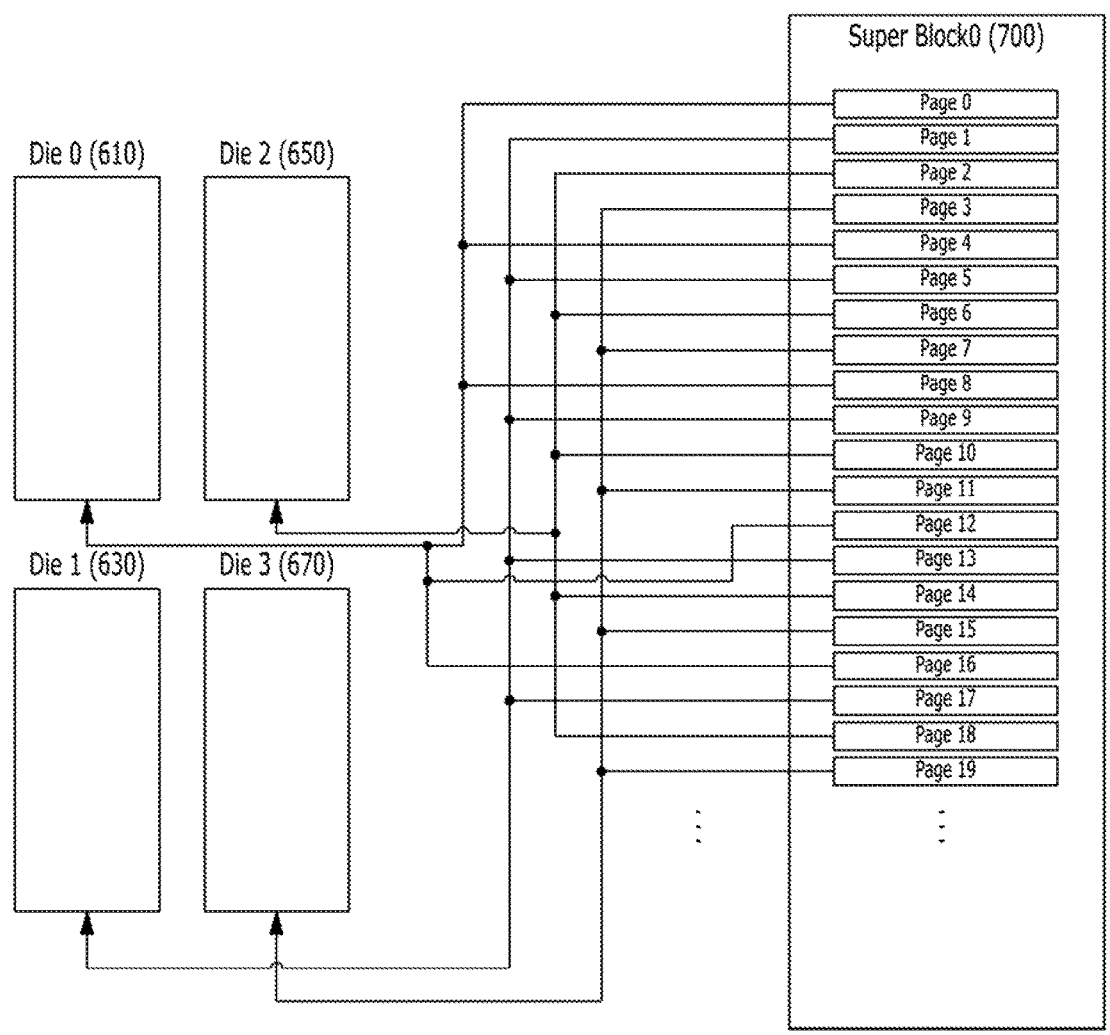

Referring to FIG. 7, as described above, the memory device 150 may include the memory dies 0 610 and 2 650 coupled to the channel 0 602, and the memory dies 1 630 and 3 670 coupled to the channel 1 604. In the embodiment of the present disclosure, for the sake of convenience in explanation, detailed descriptions will be made by taking an example that the memory dies 0 610 and 2 650 coupled to the channel 0 602 may be memory dies coupled to different ways of the channel 0 602, for example, the memory die 0 610 may be a memory die coupled to a way 0 in the channel 0 602 and the memory die 2 650 may be a memory die coupled to a way 1 in the channel 0 602. Also, the memory dies 1 630 and 3 670 coupled to the channel 1 604 may be memory dies coupled to different ways of the channel 1 604, for example, the memory die 1 630 may be a memory die coupled to a way 0 in the channel 1 604 and the memory die 3 670 may be a memory die coupled to a way 1 in the channel 1 604.

Further, in the described embodiment of the present disclosure as illustrated in FIG. 7, for the sake of convenience in explanation, detailed descriptions will be made by taking an example that the memory block 0 552 is a memory block included in the plane 0 612 of the memory die 0 610 in FIG. 6, the memory block 1 554 is a memory block included in the plane 1 616 of the memory die 0 610 in FIG. 6, the memory block 2 562 is a memory block included in the plane 0 632 of the memory die 1 630 in FIG. 6, the memory block 3 564 is a memory block included in the plane 1 636 of the memory die 1 630 in FIG. 6, the memory block 4 572 is a memory block included in the plane 0 652 of the memory die 2 650 in FIG. 6, the memory block 5 574 is a memory block included in the plane 1 656 of the memory die 2 650 in FIG. 6, the memory block 6 582 is a memory block included in the plane 0 672 of the memory die 3 670 in FIG. 6, and the memory block 7 584 is a memory block included in the plane 1 676 of the memory die 3 670 in FIG. 6.

In the memory system according to the embodiment, the memory device 150 may include a plurality of super memory blocks, and each of the super memory blocks may include a plurality of memory blocks included in the memory dies 610, 630, 650 and 670. In particular, among the plurality of super memory blocks included in the memory device 150, a random first super memory block may include at least two memory blocks included in different memory dies, as described above. Also, the different memory dies may be coupled to different channels. When, a super memory block includes at least two memory blocks included in different memory dies coupled to different channels, then, as the different memory dies are coupled to different channels, in the case where the controller 130 performs a program operation for the super memory block, the program operation may be performed through a channel interleaving scheme and a memory die interleaving scheme.

When making detailed descriptions by taking an example, among the plurality of super memory blocks included in the memory device 150, a random first super memory block, for example, a super memory block 0 700 may include a first memory block included in the memory die 0 610, a second memory block included in the memory die 1 630, a third memory block included in the memory die 2 650 and a fourth memory block included in the memory die 3 670. In the case where the first super memory block includes only 2 memory blocks, the first super memory block may include only the first memory block included in the memory die 0 610 and the second memory block included in the memory die 1 630 or may include the third memory block included in the memory die 2 650 and the fourth memory block included in the memory die 3 670. Hereinafter, for the sake of convenience in explanation, detailed descriptions will be made by taking, as an example, the case where the first super memory block includes 4 memory blocks.

Specifically, the super memory block 0 700 included in the memory device 150 may include, as a first memory block, a memory block included in the memory die 0 610, for example, the memory block 0 552, include, as a second memory block, a memory block included in the memory die 1 630, for example, the memory block 2 562, include, as a third memory block, a memory block included in the memory die 2 650, for example, the memory block 4 572, and include, as a fourth memory block, a memory block included in the memory die 3 670, for example, the memory block 6 582.

The controller 130 may perform a command operation corresponding to a command received from the host 102, in particular, a program operation corresponding to a write command received from the host 102, for the super memory block 0 700 of the memory device 150. The controller 130 may write and store segments of user data and metadata corresponding to the write command, in the plurality of pages included in the super memory block 0 700. The controller 130 may write the segments sequentially from a page 0 as a first page among the plurality of pages included in the super memory block 0 700. Since the super memory block 0 700 includes 4 memory blocks of different memory dies coupled to different channels, the segments of the user data and metadata may be written in the plurality of pages included in the super memory block 0 700, through the channel interleaving scheme and the memory die interleaving scheme.

In particular, in the embodiment of the present disclosure, as the super memory block 0 700 includes the memory block 0 552, the memory block 2 562, the memory block 4 572 and the memory block 6 582, the plurality of pages included in the memory block 0 552, the memory block 2 562, the memory block 4 572 and the memory block 6 582 may sequentially correspond to the plurality of pages included in the super memory block 0 700, through the channel interleaving scheme and the memory die interleaving scheme.

For example, the page 0 of the memory block 0 552 may become the page 0 of the super memory block 0 700, the page 0 of the memory block 2 562 may become the page 1 of the super memory block 0 700, the page 0 of the memory block 4 572 may become the page 2 of the super memory block 0 700, and the page 0 of the memory block 6 582 may become the page 3 of the super memory block 0 700. The page 1 of the memory block 0 552 may become the page 4 of the super memory block 0 700, the page 1 of the memory block 2 562 may become the page 5 of the super memory block 0 700, the page 1 of the memory block 4 572 may become the page 6 of the super memory block 0 700, and the page 1 of the memory block 6 582 may become the page 7 of the super memory block 0 700. The page 2 of the memory block 0 552 may become the page 8 of the super memory block 0 700, the page 2 of the memory block 2 562 may become the page 9 of the super memory block 0 700, the page 2 of the memory block 4 572 may become the page 10 of the super memory block 0 700, and the page 2 of the memory block 6 582 may become the page 11 of the super memory block 0 700. The page 3 of the memory block 0 552 may become the page 12 of the super memory block 0 700, the page 3 of the memory block 2 562 may become the page 13 of the super memory block 0 700, the page 3 of the memory block 4 572 may become the page 14 of the super memory block 0 700, and the page 3 of the memory block 6 582 may become the page 15 of the super memory block 0 700. The page 4 of the memory block 0 552 may become the page 16 of the super memory block 0 700, the page 4 of the memory block 2 562 may become the page 17 of the super memory block 0 700, the page 4 of the memory block 4 572 may become the page 18 of the super memory block 0 700, and the page 4 of the memory block 6 582 may become the page 19 of the super memory block 0 700.

The controller 130 may write and store, through the program operation, the segments of the user data and metadata, sequentially from the page 0 among the plurality of pages included in the super memory block 0 700. Accordingly, the segments of the user data and metadata may be written and stored sequentially in the page 0 of the memory block 0 552, the page 0 of the memory block 2 562, the page 0 of the memory block 4 572, the page 0 of the memory block 6 582, the page 1 of the memory block 0 552, the page 1 of the memory block 2 562, the page 1 of the memory block 4 572, the page 1 of the memory block 6 582, and so on. Hereinbelow, detailed descriptions will be made through an example with reference to FIG. 8, for, in a memory system according to an embodiment, a data processing operation, in particular, a booting operation and a recovery operation of the memory system, in the case where, after the memory system is changed from a power-on state to a power-off state as a sudden power-off occurs while performing the program operation for the super memory block of the memory device 150, the memory system is changed again to the power-on state.

Figure 8:
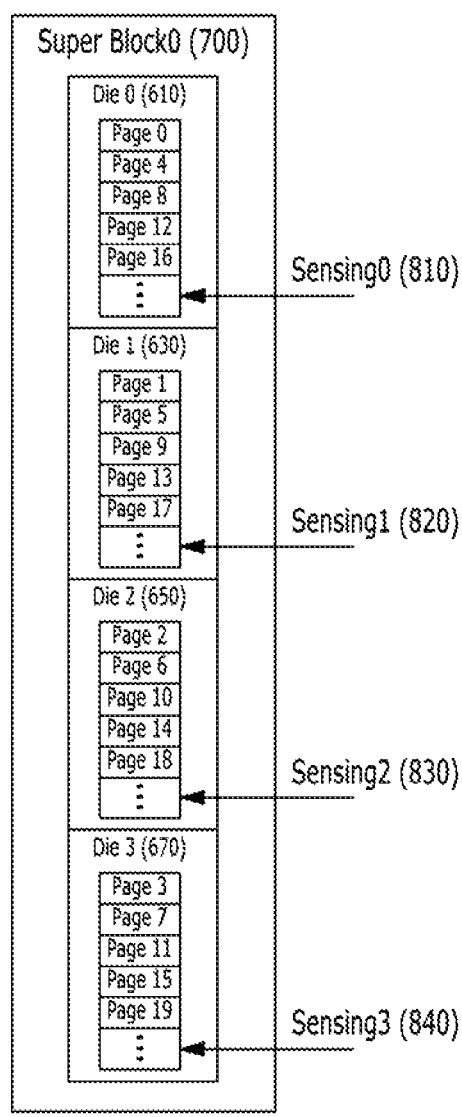

Referring to FIG. 8, as described above, the memory device 150 may include a plurality of super memory blocks, and, among the super memory blocks, a random first super memory block, for example, the super memory block 0 700 may include, as a first memory block, a memory block included in the memory die 0 610, for example, the memory block 0 552, include, as a second memory block, a memory block included in the memory die 1 630, for example, the memory block 2 562, include, as a third memory block, a memory block included in the memory die 2 650, for example, the memory block 4 572, and include, as a fourth memory block, a memory block included in the memory die 3 670, for example, the memory block 6 582.

As described above, the plurality of pages included in the super memory block 0 700 may sequentially correspond to the plurality of pages included in the memory block 0 552, the memory block 2 562, the memory block 4 572 and the memory block 6 582, through the channel interleaving scheme and the memory die interleaving scheme. For instance, the page 0 of the super memory block 0 700 may be the page 0 of the memory block 0 552, the page 1 of the super memory block 0 700 may be the page 0 of the memory block 2 562, the page 2 of the super memory block 0 700 may be the page 0 of the memory block 4 572, the page 3 of the super memory block 0 700 may be the page 0 of the memory block 6 582, the page 4 of the super memory block 0 700 may be the page 1 of the memory block 0 552, the page 5 of the super memory block 0 700 may be the page 1 of the memory block 2 562, the page 6 of the super memory block 0 700 may be the page 1 of the memory block 4 572, the page 7 of the super memory block 0 700 may be the page 1 of the memory block 6 582, the page 8 of the super memory block 0 700 may be the page 2 of the memory block 0 552, the page 9 of the super memory block 0 700 may be the page 2 of the memory block 2 562, the page 10 of the super memory block 0 700 may be the page 2 of the memory block 4 572, the page 11 of the super memory block 0 700 may be the page 2 of the memory block 6 582, the page 12 of the super memory block 0 700 may be the page 3 of the memory block 0 552, the page 13 of the super memory block 0 700 may be the page 3 of the memory block 2 562, the page 14 of the super memory block 0 700 may be the page 3 of the memory block 4 572, the page 15 of the super memory block 0 700 may be the page 3 of the memory block 6 582, the page 16 of the super memory block 0 700 may be the page 4 of the memory block 0 552, the page 17 of the super memory block 0 700 may be the page 4 of the memory block 2 562, the page 18 of the super memory block 0 700 may be the page 4 of the memory block 4 572, and the page 19 of the super memory block 0 700 may be the page 4 of the memory block 6 582.

The controller 130 may perform a command operation corresponding to a command received from the host 102, in particular, a program operation corresponding to a write command, in the state in which the memory system is powered on. The controller 130 may write and store the segments of user data and metadata corresponding to the write command, sequentially from the page 0 among the plurality of pages of the super memory block 0 700 corresponding to the plurality of pages of the memory block 0 552, the memory block 2 562, the memory block 4 572 and the memory block 6 582, through the channel interleaving scheme and the memory die interleaving scheme. That is to say, the segments of the user data and metadata may be written and stored sequentially in the page 0 of the memory block 0 552, the page 0 of the memory block 2 562, the page 0 of the memory block 4 572, the page 0 of the memory block 6 582, the page 1 of the memory block 0 552, the page 1 of the memory block 2 562, the page 1 of the memory block 4 572, the page 1 of the memory block 6 582, and so on.

In the case where, after the memory system is changed from a power-on state to a power-off state as a sudden power-off occurs while performing, in the power-on state of the memory system, the program operation sequentially for the pages of the super memory block 0 700, the memory system is changed again from the power-off state to the power-on state, the controller 130 may perform a booting operation and a recovery operation.

When making detailed descriptions by taking an example, in the case where, after the memory system is changed, at a first time, from a power-on state to a power-off state as a sudden power-off occurs while performing, in the power-on state of the memory system, the program operation for the page 12, the page 13, the page 14 and the page 15 of the super memory block 0 700, the memory system is changed again, at a second time, from the power-off state to the power-on state, the controller 130 may perform a booting operation and a recovery operation for the memory device 150.

Namely, at the first time, with the memory system powered on, the controller 130 may perform the program operation for the page 12, the page 13, the page 14 and the page 15 of the super memory block 0 700. In other words, the controller 130 may perform the program operation for the page 3 of the memory block 0 552 included in the memory die 0 610, the page 3 of the memory block 2 562 included in the memory die 1 630, the page 3 of the memory block 4 572 included in the memory die 2 650 and the page 3 of the memory block 6 582 included in the memory die 3 670. While performing, in this manner, the program operation for the page 12, the page 13, the page 14 and the page 15 of the super memory block 0 700, if a sudden power-off occurs in the memory system, the memory system may be changed from a power-on state to a power-off state.

Then, at a second time, if the memory system is changed again from the power-off state to the power-on state, the controller 130 may sense, through a binary scanning scheme, pages for which the program operation is performed last in the super memory block 0 700 before the memory system becomes the power-off state, that is, at the first time (810, 820, 830 and 840). In other words, the controller 130 may perform a booting operation for the memory device 150, at the second time. In the booting operation, by using the binary scanning scheme, the controller 130 may sense the pages for which the program operation is performed last in the super memory block 0 700 at the first time, that is, the page 12, the page 13, the page 14 and the page 15 of the super memory block 0 700 (810, 820, 830 and 840).

As described above, in the case of performing the program operation for the plurality of pages included in the super memory block 0 700, the controller 130 may perform the program operation for the plurality of pages included in the memory block 0 552, the memory block 2 562, the memory block 4 572 and the memory block 6 582, through the channel interleaving scheme and the memory die interleaving scheme. Thus, in correspondence to the channel interleaving scheme and the memory die interleaving scheme, the controller 130 may perform the booting operation simultaneously for the memory block 0 552, the memory block 2 562, the memory block 4 572 and the memory block 6 582. In the booting operation, by using the binary scanning scheme, the controller 130 may perform sensing of the pages which are programmed last at the first time in the memory block 0 552, the memory block 2 562, the memory block 4 572 and the memory block 6 582, that is, perform simultaneously sensing 0 810 of the page 3 of the memory block 0 552 included in the memory die 0 610, sensing 1 820 of the page 3 of the memory block 2 562 included in the memory die 1 630, sensing 2 830 of the page 3 of the memory block 4 572 included in the memory die 2 650 and sensing 3 840 of the page 3 of the memory block 6 582 included in the memory die 3 670.

In other words, the controller 130 may perform the program operation, through the channel interleaving scheme and the memory die interleaving scheme, for the super memory block 0 700 including the memory block 0 552 of the memory die 0 610, the memory block 2 562 of the memory die 1 630, the memory block 4 572 of the memory die 2 650 and the memory block 6 582 of the memory die 3 670, in the state in which the memory system is powered on. Also, if the power state of the memory system is changed, for instance, if the memory system is changed again to a power-on state after being changed to a power-off state as a sudden power-off occurs, the controller 130 may sense the pages programmed in the super memory block 0 700, in correspondence to the channel interleaving scheme and the memory die interleaving scheme in the program operation. In particular, in consideration of an interleaving scheme for the memory dies 610, 630, 650 and 670 included in the super memory block 0 700, the controller 130 may sense simultaneously the pages programmed in all of the memory dies 610, 630, 650 and 670 included in the super memory block 0 700. That is to say, the controller 130 may sense the pages programmed in the four memory dies 610, 630, 650 and 670, through not 4 tR periods but 1 tR period for the 4 memory dies 610, 630, 650 and 670. Accordingly, as the controller 130 may perform the sensing operation for the memory dies 610, 630, 650 and 670 of the super memory block 0 700 through a short tR period, it is possible to perform quickly and precisely the sensing operation for the super memory block 0 700.

After sensing, as described above, the pages programmed in the super memory block 0 700, in the booting operation for the memory device 150, the controller 130 may perform the recovery operation for the super memory block 0 700. The controller 130 may perform the recovery operation for the page 12, the page 13, the page 14 and the page 15 of the super memory block 0 700 for which the program operation is performed at the first time.

As a consequence, in a memory system according to an embodiment of the present invention, in the case of performing a booting operation as the memory system is changed from a power-off state to a power-on state, the booting operation may be quickly performed. In particular, sensing of the pages programmed in each super memory block, that is, a sensing operation for the pages simultaneously programmed in all memory dies, may be performed, for all the memory dies included in each super memory block of the memory device 150, using an interleaving scheme. Accordingly, it is possible to more quickly and precisely perform a booting operation and a recovery operation. Hereinbelow, an operation for processing data in a memory system according to an embodiment will be described below in detail with reference to FIG. 9.

Figure 9:
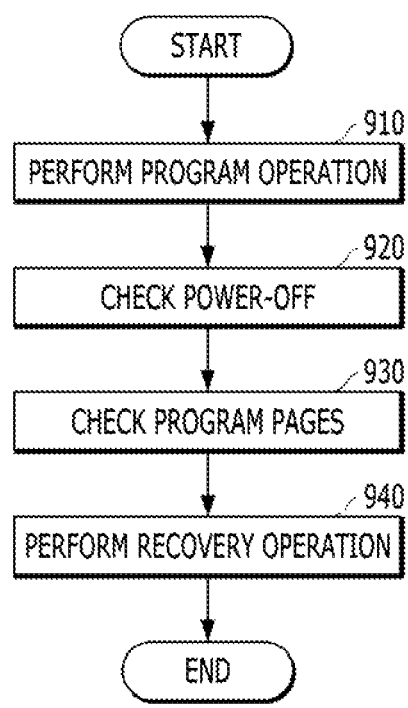
FIG. 9 is a flow chart of a data processing operation in a memory system according to an embodiment of the present invention.

FIG. 9 is a flow chart of a data processing operation in a memory system according to an embodiment.

Referring to FIG. 9, at step 910, the memory system may perform a command operation corresponding to a command received from the host 102, for example, a program operation corresponding to a write command received from the host 102. At this time, after storing segments of user data and metadata corresponding to the write command, in the memory 144 of the controller 130, the segments stored in the memory 144 may be written and stored in a super memory block including a plurality of memory blocks in the memory device 150. The super memory block may include a plurality of memory blocks included in a plurality of memory dies. The memory dies may be coupled to different channels. The segments of the user data and metadata may be sequentially written and stored in the plurality of pages included in each super memory block using a channel interleaving scheme and a memory interleaving scheme.

At step 920, in the case where a sudden power-off occurs in the memory system while the memory system performs the program operation in a powered-on state, the sudden power-off of the memory system may be checked, that is, the change of the memory system to a power-off state may be checked.

Then, at step 930, in the case where the memory system is changed from the power-off state to a power-on state, by performing a booting operation for the memory device 150, pages which are normally program-completed and pages which are not normally program-completed after program is started may be checked in each super memory block of the memory device 150. At this time, in correspondence to the channel interleaving scheme and the memory die interleaving scheme in the program operation, the pages programmed in each super memory block of the memory device 150 may be sensed.

At step 940, a recovery operation may be performed for the pages which are not normally program-completed in each super memory block of the memory device 150.

Since detailed descriptions were made above with reference to FIGS. 5 to 8 for performing of, with the memory system powered on, a command operation corresponding to a command received from the host 102, for example, a program operation corresponding to a write command, in particular, a program operation through the channel interleaving scheme and the memory die interleaving scheme for each super memory block, for memory dies and memory blocks in each super memory block included in the memory device 150, and a booting operation and a recovery operation in each super memory block of the memory device 150, in particular, a sensing operation for the pages programmed in each super memory block, in the case where a sudden power-off occurs in the memory system while performing the program operation, further descriptions thereof will be omitted herein. Hereinbelow, detailed descriptions will be made with reference to FIGS. 10 to 15, of electronic devices employing a memory system, according to various embodiments of the present inventive concept.

Figure 10:
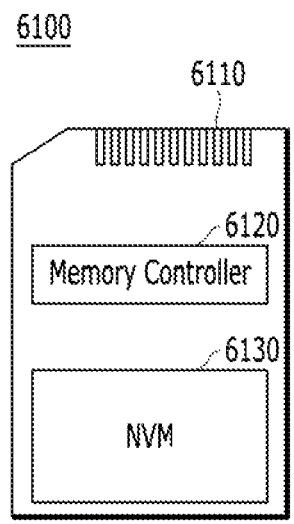
FIGS. 10 to 15 are diagrams illustrating various memory systems, according to embodiments of the present invention.

Referring now to FIG. 10 a memory card system 6100 is provided, according to an embodiment of the present invention.

The memory card system 6100 may include a memory controller 6120, a memory device 6130, and a connector 6110.

The memory controller 6120 may be operatively coupled with the memory device 6130. The memory controller 6120 may access the memory device 6130 for controlling the operations of the memory device 6130. For example, the memory controller 6120 may control the read, write, erase and background operations of the memory device 6130. The memory controller 6120 may be also configured to provide an interface between the memory device 6130 and a host via the connector 6110. The memory controller may drive a firmware for controlling the memory device 6130.

The memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), WIFI and Bluetooth. Accordingly, the memory system and the data processing system, according to an exemplary embodiment, may be applied to wired/wireless electronic appliances, in particular, a mobile electronic appliance.

The memory device 6130 may be a nonvolatile memory NVM. For example, the memory device 6130 may be one of various nonvolatile memory devices such as an EPROM, an EEPROM, a NAND flash memory, a NOR flash memory, a PRAM, a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may form a solid state driver (SSD) by being integrated into a single semiconductor device. Also, the memory controller 6120 and the memory device 6130 may form a memory card such as a PC card (Personal Computer Memory Card International Association; PCMCIA), a compact flash card (CF), a smart media card (SM and SMC), a memory stick, a multimedia card (MMC, RS-MMC, MMC-micro and eMMC), an SD card (SD, miniSD, microSD and SDHC) and a universal flash storage (UFS).

Figure 11:
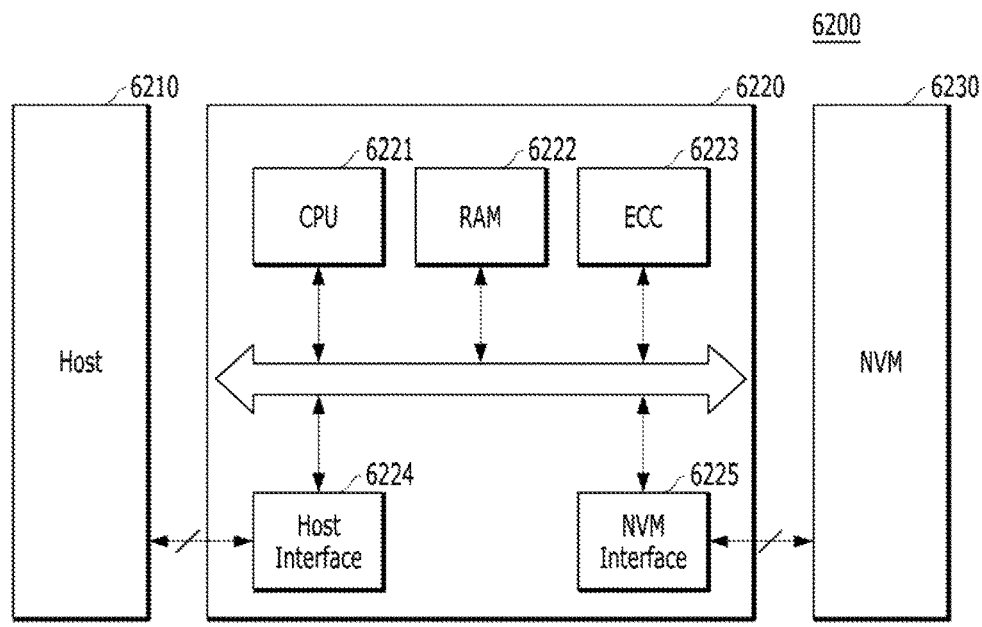

FIG. 11 is a diagram illustrating an example of a data processing system 6200 including a memory system, according to an embodiment of the present invention.

Referring to FIG. 11, the data processing system 6200 may include a memory device 6230 which is implemented by at least one nonvolatile memory NVM and a memory controller 6220 which controls the memory device 6230. The data processing system 6200 shown in FIG. 11 may be a storage medium such as a memory card (e.g., a CF, a SD or a microSD), as described above with reference to FIG. 1. The memory device 6230 may correspond to the memory device 150 in the memory system 110 described above with reference to FIG. 1. The memory controller 6220 may correspond to the controller 130 in the memory system 110 described above with reference to FIG. 1.

The memory controller 6220 may control the operations of the memory device 6230 including read, write and erase operations in response to commands received from a host 6210. The memory controller 6220 may include at least one CPU 6221, a buffer memory, for example, a RAM 6222, an ECC circuit 6223, a host interface 6224, and a memory interface, for example, an NVM interface 6225, all electrically coupled via an internal bus.

The CPU 6221 may control the operations for the memory device 6230, for example, read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 may be temporarily stored in the RAM 6222. In the case where the RAM 6222 is used as a buffer memory, the RAM 6222 may be used to buffer data to be transmitted from the host 6210 to the memory device 6230 or from the memory device 6230 to the host 6210. In the case where the RAM 6222 is used as a cache memory, the RAM 6222 may be used to enable the memory device 6230 of a low speed to operate at a high speed.

The ECC circuit 6223 may correspond to the ECC unit 138 of the controller 130 described above with reference to FIG. 1. As described above with reference to FIG. 1, the ECC circuit 6223 generates an error correction code (ECC) for correcting a fail bit or an error bit in the data received from the memory device 6230. Also, the ECC circuit 6223 may perform error correction encoding for data to be provided to the memory device 6230, and generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of an LDPC code, a BCH code, a turbo code, a Reed-Solomon code, a convolution code, an RSC, a TCM and a BCM.

The memory controller 6220 may transmit and receive data to and from the host 6210 through the host interface 6224, and transmit and receive data to and from the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WIFI or long term evolution (LTE) is implemented, the memory controller 6220 may transmit and receive data by being connected with an external device, for example, the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, in particular, a mobile electronic appliance.

Figure 12:
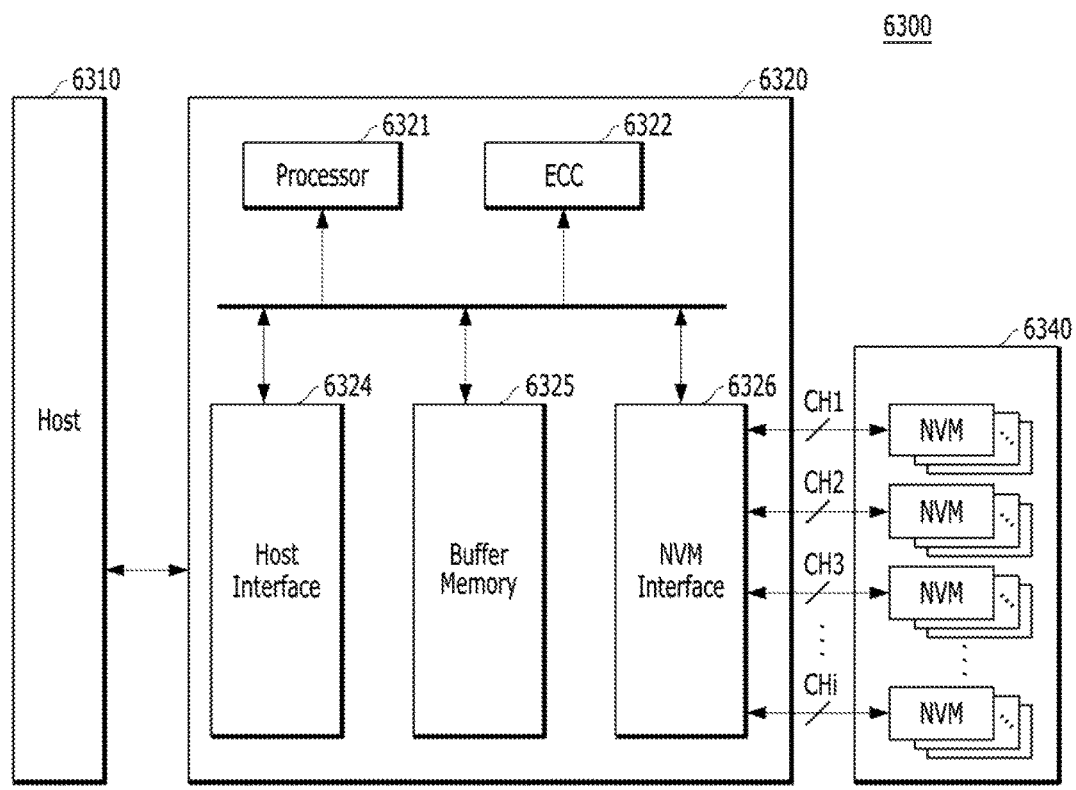

FIG. 12 is a diagram illustrating a solid state drive (SSD) 6300 employing a memory system, according to an embodiment of the present invention.

Referring to FIG. 12, an SSD 6300 may include a memory device 6340 which includes a plurality of nonvolatile memories NVM, and a controller 6320. The controller 6320 may correspond to the controller 130 in the memory system 110 described above with reference to FIG. 1. The memory device 6340 may correspond to the memory device 150 in the memory system 110 described above with reference to FIG. 1.

The controller 6320 may be connected with the memory device 6340 through a plurality of channels CH1, CH2, CH3, . . . and CHi. The controller 6320 may include at least one processor 6321, a buffer memory 6325, an ECC circuit 6322, a host interface 6324, and a memory interface, for example, a nonvolatile memory (NVM) interface 6326.

The buffer memory 6325 may temporarily store data received from a host 6310 or data received from a plurality of nonvolatile memories NVM included in the memory device 6340, or temporarily store metadata of the plurality of nonvolatile memories NVM, for example, map data including mapping tables. The buffer memory 6325 may be implemented by a volatile memory such as, but not limited to, a DRAM, an SDRAM, a DDR SDRAM, an LPDDR SDRAM and a GRAM or a nonvolatile memory such as, but not limited to, an FRAM, a ReRAM, an STT-MRAM and a PRAM. While it is illustrated in FIG. 12, as an example, that the buffer memory 6325 is disposed inside the controller 6320, it is noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device, for example, the host 6310. The nonvolatile memory interface 6326 may provide an interface function with respect to the memory device 6340 which is connected through the plurality of channels CH1, CH2, CH3, . . . and CHi.

In an exemplary embodiment, a redundant array of independent disks (RAID) system may be provided the system including a plurality of SSDs 6300. Each SSD 6300 may employ the memory system 110 described above with reference to FIG. 1. In a RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the write command received from the host 6310, among a plurality of RAID levels, that is, the plurality of SSDs 6300, and may output data corresponding to the write command, to the selected SSD 6300. Also, in the case of performing a read operation by receiving a read command from the host 6310, the RAID controller may select at least one memory system, that is, at least one SSD 6300, in correspondence to the RAID level information of the write command received from the host 6310, among the plurality of RAID levels, that is, the plurality of SSDs 6300, and may provide data outputted from the selected SSD 6300, to the host 6310.

Figure 13:
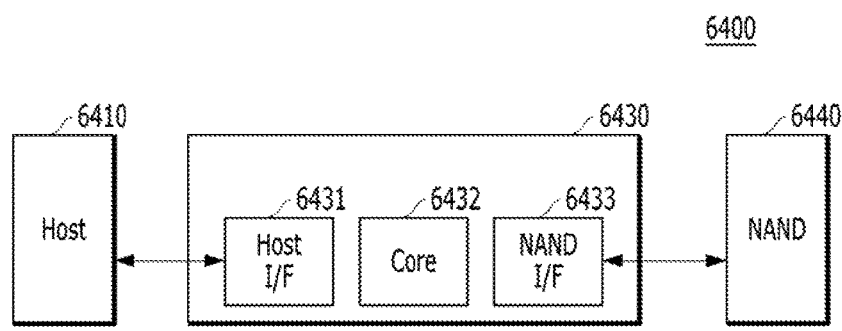

FIG. 13 is a diagram illustrating a data processing system 6400 including a memory system, according to an embodiment of the present invention. FIG. 13 schematically illustrates an embedded multimedia card (eMMC) to which a memory system is applied, according to an embodiment of the present invention.

Referring to FIG. 13, an eMMC 6400 may include a memory device 6440 which is implemented by at least one NAND flash memory, and a controller 6430. The controller 6430 may correspond to the controller 130 in the memory system 110 described above with reference to FIG. 1. The memory device 6440 may correspond to the memory device 150 in the memory system 110 described above with reference to FIG. 1.

The controller 6430 may be connected with the memory device 6440 through a plurality of channels indicated by the two headed arrow. The controller 6430 may include at least one core 6432, a host interface 6431, and a memory interface, for example, a NAND interface 6433.

The core 6432 may control the operations of the eMMC 6400, the host interface 6431 may provide an interface function between the controller 6430 and a host 6410, and the NAND interface 6433 may provide an interface function between the memory device 6440 and the controller 6430. For example, the host interface 6431 may be a parallel interface, for example, an MMC interface, as described above with reference to FIG. 1, or may be a serial interface, for example, an ultra-high speed (UHS)-I/UHS-II and a UFS interface.

Figure 14:
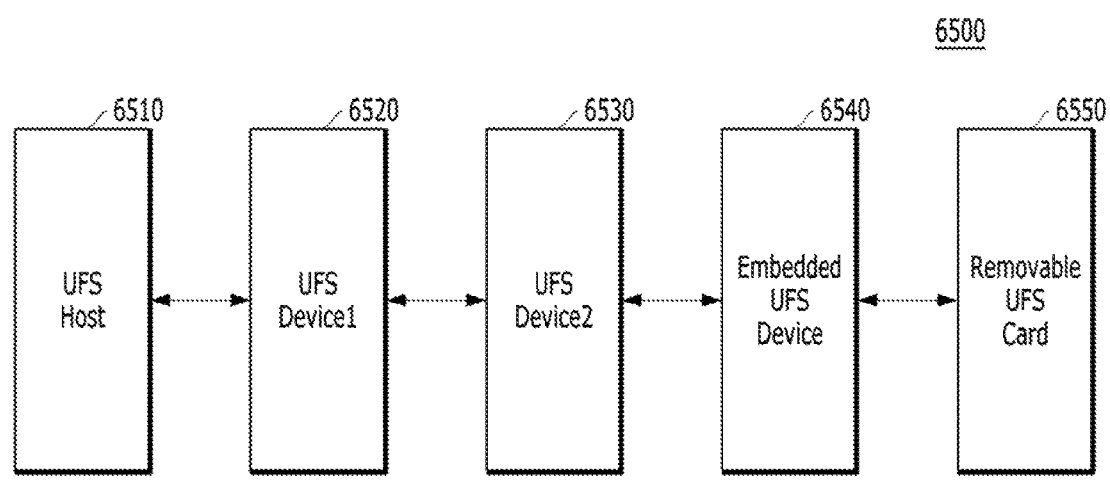

FIG. 14 is a diagram illustrating a universal flash storage (UFS) system 6500 having a memory system according to an embodiment of the invention.

Referring to FIG. 14, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, in particular, a mobile electronic appliance.

The UFS host 6510, the UFS devices 6520 and 6530, the embedded UFS device 6540 and the removable UFS card 6550 may respectively communicate with external devices, that is, wired/wireless electronic appliances, in particular, a mobile electronic appliance, through a UFS protocol. The UFS devices 6520 and 6530, the embedded UFS device 6540 and the removable UFS card 6550 may be implemented as the memory system 110 described above with reference to FIG. 1, in particular, as the memory card system 6100 described above with reference to FIG. 10. The embedded UFS device 6540 and the removable UFS card 6550 may communicate through another protocol other than the UFS protocol. For example, the embedded UFS device 6540 and the removable UFS card 6550 may communicate through various card protocols, for example, but not limited to, UFDs, MMC, secure digital (SD), mini SD and Micro SD.

Figure 15:
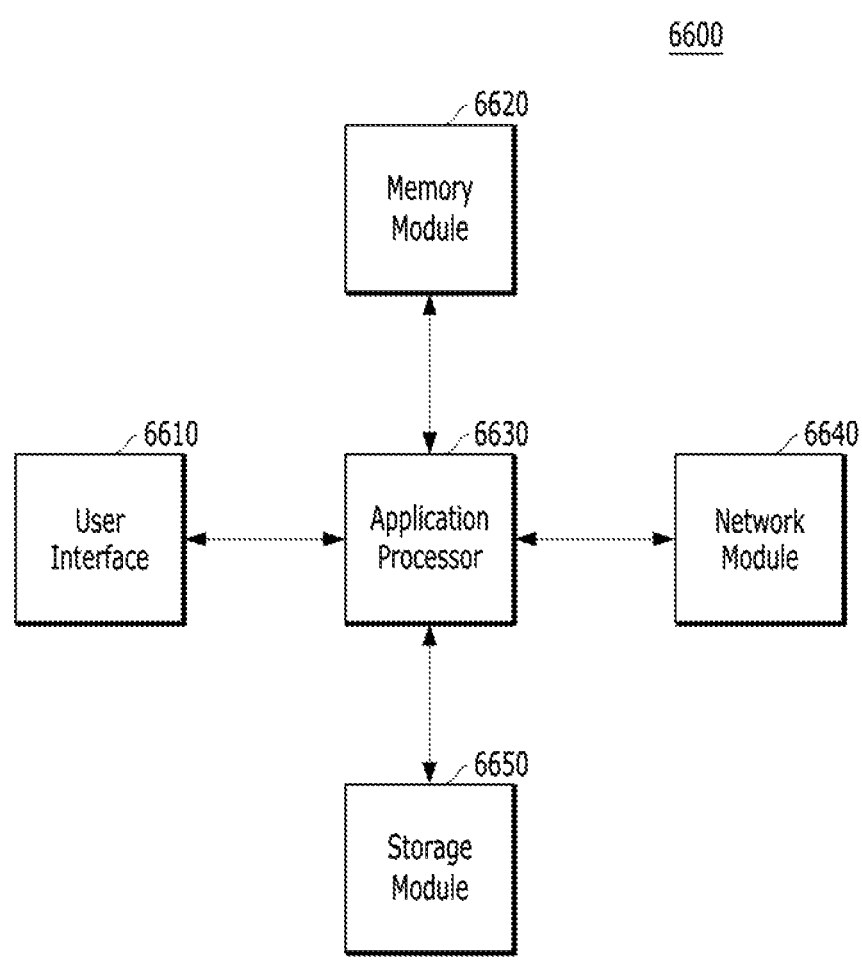

FIG. 15 is a diagram illustrating a user system having a memory system, according to an embodiment of the present invention.

Referring to FIG. 15, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, a ReRAM, an MRAM and an FRAM. For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, WI-DI, and so on, and may thereby communicate with wired/wireless electronic appliances, in particular, a mobile electronic appliance. Accordingly, the memory system and the data processing system may be applied to wired/wireless electronic appliances. The network module 6640 may be included in the application processor 6630.

The storage module 6650 may store data, for example, data received from the application processor 6630, and transmit data stored therein, to the application processor 6630. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. Also, the storage module 6650 may be provided as a removable storage medium such as a memory card of the user system 6600 and an external drive. That is to say, the storage module 6650 may correspond to the memory system 110 described above with reference to FIG. 1, and may be implemented as the SSD, eMMC and UFS described above with reference to FIGS. 12 to 14.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6600 according to an exemplary embodiment, the application processor 6630 may control the operations of the mobile electronic appliance, and the network module 6640 as a communication module controls wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of the memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of memory dies, each die including a plurality of memory blocks, each block including a plurality of pages; and
   a controller suitable for performing a command operation for the memory device and storing segments of user data and metadata for the command operation in a super memory block including memory blocks of memory dies included in a first memory die group and a second memory die group among the plurality of memory dies,
   wherein the super memory block includes a first memory block included in a first memory die in the first memory die group and a second memory block included in a second memory die in the second memory die group,
   wherein the pages of the super memory block alternately correspond to pages of the first memory block and pages of the second memory block,
   wherein, in a power-on state of the memory system, the controller stores a first segment in a first page of the first memory block corresponding to a first page of the super memory block, and then, stores a second segment in a first page of the second memory block corresponding to a second page of the super memory block.

2. The memory system according to claim 1, wherein the controller sequentially stores the segments in pages included in the super memory block, through at least one scheme of a channel interleaving scheme and a memory die interleaving scheme.

3. The memory system according to claim 1, wherein, if a power-off occurs in the memory system while storing the first segment and the second segment and then the memory system is changed again to the power-on state, the controller performs a booting operation for the super memory block.

4. The memory system according to claim 3, wherein the controller senses simultaneously the first page in the first memory block and the first page in the second memory block, in correspondence to the at least one scheme, during the booting operation.

5. A method for operating a memory system, comprising:
receiving a command from a host, for a plurality of pages which are included in each of a plurality of memory blocks of a memory device;
performing a command operation corresponding to the command, for the plurality of memory blocks included in a plurality of memory dies included in the memory device; and
storing segments of user data and metadata for the command operation, in a super memory block including memory blocks of memory dies included in a first memory die group and a second memory die group among the plurality of memory dies,
wherein the super memory block includes a first memory block included in a first memory die in the first memory die group and a second memory block included in a second memory die in the second memory die group,
wherein the pages of the super memory block alternately correspond to pages of the first memory block and pages of the second memory block,
wherein the storing comprises, in a power-on state of the memory system: storing a first segment in a first page of the first memory block corresponding to a first page of the super memory block; and storing a second segment in a first page of the second memory block corresponding to a second page of the super memory block.

6. The method according to claim 5, wherein the storing sequentially stores the segments in pages included in the super memory block, through at least one scheme of a channel interleaving scheme and a memory die interleaving scheme.

7. The method according to claim 5, further comprising:
performing a booting operation for the super memory block, if a power-off occurs in the memory system while storing the first segment and the second segment and then the memory system is changed again to the power-on state.

8. The method according to claim 7, wherein the performing of the booting operation comprises:
sensing simultaneously the first page in the first memory block and the first page in the second memory block, in correspondence to the at least one scheme.

* * * * *